United States Patent [19]

Slehofer

[11] Patent Number: 4,827,657

[45] Date of Patent: May 9, 1989

[54] FISHING EQUIPMENT

[76] Inventor: James R. Slehofer, 4045 S. Amelia Ave., Lyons, Ill. 60534

[21] Appl. No.: 202,240

[22] Filed: Jun. 6, 1988

[51] Int. Cl.$^4$ .............................................. A01K 83/06
[52] U.S. Cl. ...................................... 43/44.2; 43/42.24
[58] Field of Search ..................... 43/42.24, 44.2, 42.28

[56] References Cited

U.S. PATENT DOCUMENTS

| | | | |
|---|---|---|---|
| 185,914 | 1/1877 | Gregg | 43/42.24 |
| 821,732 | 5/1906 | Olsby | 43/42.24 |
| 1,922,841 | 8/1933 | Cooley | 43/42.24 |
| 2,450,988 | 10/1948 | Putnam et al. | 43/42.24 |
| 2,507,098 | 5/1950 | Fischler | 43/42.16 |
| 2,521,616 | 9/1950 | Weber | 43/42.24 |
| 2,563,522 | 8/1951 | Fisher | 43/42.24 |
| 3,224,133 | 12/1965 | Emard | 43/42.24 |
| 3,245,171 | 4/1966 | Henry | 43/42.24 |
| 3,483,650 | 12/1969 | Weaver | 43/42.24 |
| 3,537,207 | 11/1970 | McCellan et al. | 43/42.24 |

Primary Examiner—M. Jordan
Attorney, Agent, or Firm—Frederick J. Krubel

[57] ABSTRACT

A dual purpose device usable in conjunction with a conventional fishhook to either retain fishing bait in the form of a semi-plastic generally globular mass of fish food on and substantially concealing the barbed end of the fishhook or, alternatively, to serve as an inorganic artificial lure alone or in combination with a live bait also attached to the fishhook; the device is made of a single elongated ribbon of non-metallic, resilient material and is in the form of a helical coil spring with each coil having a generally frustoconical shape in side elevation so as to provide a helically extending wall which projects radially outwardly from the longitudinal axes thereof and longitudinally toward one end thereof; the shank portion of the fishhook extends longitudinally through the coils of the device and is frictionally secured thereto; the device may be made in a variety of colors.

15 Claims, 1 Drawing Sheet

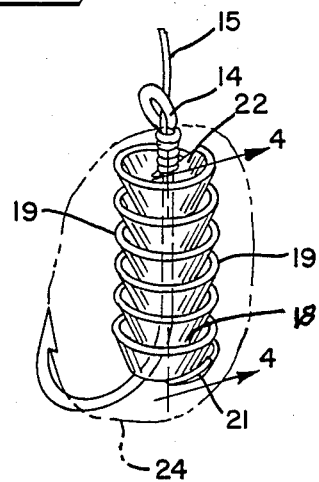
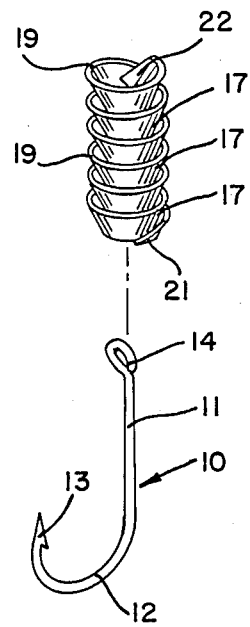
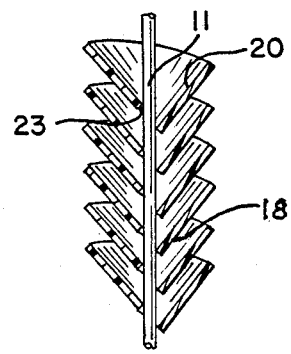
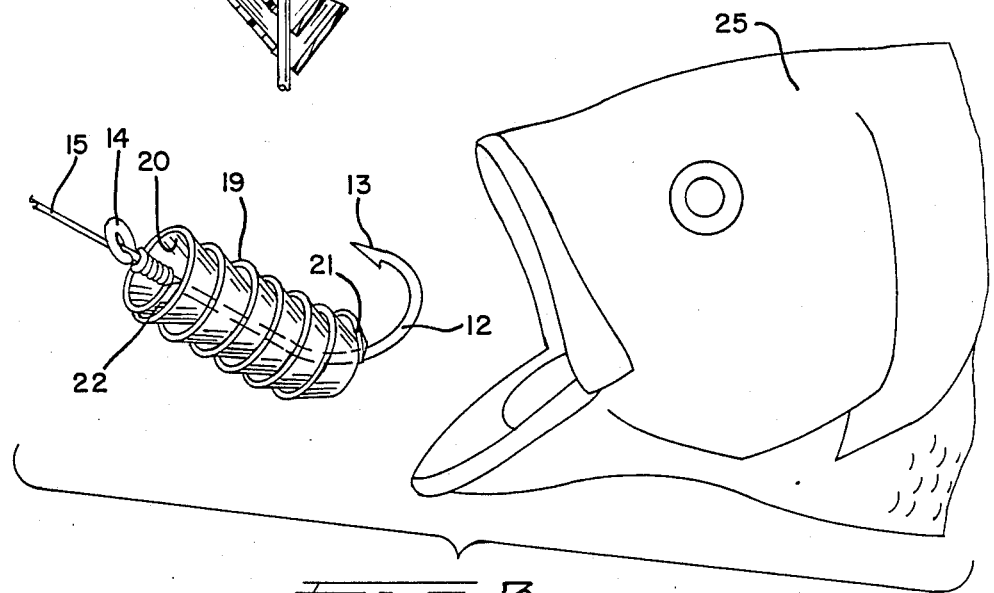

FISHING EQUIPMENT

BACKGROUND OF THE INVENTION

This invention relates generally to fishing equipment or gear and, more particularly, to a unique dual purpose device usable in conjunction with a conventional fishhook to either retain a fishing bait in the form of a semiplastic, generally globular mass of fish food thereon or, alternatively, to serve as an artificial lure alone or in combination with a live bait also attached to the fish hook.

As is well known, there are many different fishing techniques used by fishermen, such as still fishing, bottom fishing, and surface casting, for attracting and catching fish. Understandably, the kind and amount of equipment or gear required to practice one fishing technique may vary from that required to practice another fishing technique. However, all such fishing gear have at least one basic item in common and that is a lure or bait for attracting fish to the fishhook. Regardless of the particular fishing technique being employed by the fisherman in a particular situation, some form of fish lure is an essential and important part of his or/her equipment.

Fishing lures or baits utilized in conjunction with fishhooks for attracting and catching fish can take a multitude of different forms and shapes, and be composed of a variety of organic as well as inorganic materials. Basically, certain fishing lures or baits can be defined as natural or live such as fresh or live worms, frogs, minnows or other small fish, while other lures and bait are, in essence, man-made of organic and/or inorganic materials and may be broadly termed "artificial".

The advantages and disadvantages of using natural lures or baits in comparison with using artificial lures or baits are well known. The primary objections to natural lures or baits result from the fact that the lures or baits are actually living organisms. Thus, there is the problem of having an adequate and continuous supply of fresh lures or baits on hand throughout the fishing operation. Obviously, such problem not only entails the necessity to constantly obtain fresh or live bait such as worms, frogs, small fish or the like, but also to keep such natural bait alive until ready to be used. Moreover, it is important that the bait be kept alive and, thus, effective to attract fish, for long periods of time. The following U.S. patents disclose devices for use in conjunction with fishhooks for securing a natural bait thereto:

2,115,493 Kosten
2,454,879 Mattingly
2,775,058 Roberts
3,863,383 Lore
3,399,483 Naffziger
3,905,149 McCloud
4,221,069 Esses
4,603,502 MacDonald While all of the fishing lure or bait devices disclosed in the above-listed prior art patents are no double successful to some degree in overcoming the shortcomings noted above inherent in natural bait fishing, such fishing lure or bait devices obviously are incapable, by themselves, of completely solving the problem confronting the fisherman of having a continuous supply of live fishing bait available at all times.

Because of the foregoing inherent and other well known disadvantages of natural lures or bait, a multitude of various artificial lures and baits have been proposed to overcome such disadvantages without sacrificing the fishing-attracting qualities possessed by natural lures and baits. One such attempt is exemplified in U.S. Pat. No. 1,851,698 to Fitch wherein a fishhook is provided with means whereby the fisherman, without detaching the hook from the line, can easily change the apperance or shape of a fly type bait as desired. Although the fishhook assemblage disclosed in the Fitch patent no doubt will suffice and be adequate to catch fish under many different fishing conditions, it is only capable of attracting fish by their sense of sight alone.

Thus, in order to further enhance the fish-attracting qualities of artificial bait, various proposals have been advanced to entice fish to the hook by appealing to their senses of smell and taste as well as to their sense of sight. One such proposal involves the utilization of an artificial bait of the type generally referred to as "stink dough" or simply as "dough" bait. The utilization of artificial bait in the form of dough bait as a viable substitute for live bait has long been appreciated by fisherman. Dough bait, which is available commercially or is prepared by the angler himself, generally comprises a variety of aroma-emitting ingredients, such as corn flour, white bread scraps, chopped fish and meat parts, cheeses, and salmon eggs as an example. The dough bait ingredients are kneaded into a putty-like, pliable, semi-plastic mass. A globular portion of the bait material is then placed on the fishhook. Although, the utilization of dough bait does obviate to some extent the expenses and problems noted above attendant with live bait fishing, the problem of retaining or holding dough bait in close proximity to the fishhook for long periods of time has not, prior to the present invention, been fully solved.

Numerous attempts have been made to solve the problem of securely holding artificial bait in close proximity to the fishhook for long periods of time. The following U.S. patents each disclose means for holding an artificial bait designed to emit odors/and or minute particles of fish food in the water surrounding the fishhook:

2,555,088 Irwin
2,632,276 Hale
2,869,279 Pretorius
2,910,800 Cicala
3,066,434 Duller
4,554,756 Thomas All of the fishing hook and artificial bait holder assemblages disclosed in the above-listed prior art patents involve the mounting of artificial bait means adjacent to the barbed end of a fishhook and require a specially designed enclosure for the bait material in the form of a cloth bag, capsule or other similar hollow container. Obviously, such fish bait enclosures or containers can be costly to manufacture and such manufacturing costs add to overall cost of the fishing hook and artificial bait assemblages.

It will also be appreciated that with the possible exception of the fishhook shown in U.S. Pat. No. 2,555,088, the fishhook of each of the fishhook and artificial bait holder assemblages disclosed in the above-listed patents is not in the form of a commercially available, standard barbed hook, but rather it is in the form of a specific and unique design in order to accommodate the particular bait holder associated therewith. Thus, the cost of manufacturing such fishhook and bait holder assemblages is further increased.

Moreover, in all of the fishhook and artificial bait assemblages disclosed in the above-listed prior art patents, the fish-attracting bait material is fully or at least substantially enclosed while the barbed end of the fishhoo, is exposed and in full view of the fish when in use.

U.S. Pat. No. 3,778,920 to Anton et al. discloses a device for securing and retaining an artificial bait, such as a cluster of salmon eggs on a fishing hook. The bait retaining device is alleged to supplement the bait-holding capability of the fishhook alone.

There are occasions during a fishing outing when a fisherman desires to switch from one method of fishing to another method. As an example, fish may not be srtiking a fishhook provided with dough bait and he wishes to try using a live bait, and/or artificial bait or lure made of an inorganic material. To be able to fulfill such desires, the angler, of necessity, must carry a large number of different sets of hooks and lures. The present invention, as will be pointed out hereinafter, obviates the necessity of having a variety of different hook and lure assemblages available in order to practice different methods of fishing.

SUMMARY OF THE INVENTION

Accordingly, it is a primary objective of the present invention to provide a unique dual purpose device usable in conjunction with a conventional fishhook to either retain fishing bait in the form of a semi-plastic, generally globular mass of fish food on and substantially concealing the barbed end of the fishhook or, alternatively, to serve as an inorganic artificial lure, alone or in combination with a live bait also attached to the fishhook.

Another object of the invention is to provide a new and improved device which is readily assembled on or disassembled from the shank portion of a conventional fishhook without the need of any tools or the like and which is operable to firmly secure and retain dough bait about the fishhook for long time periods of use.

A further object of the present invention is to provide a novel dual purpose device which is adapted to encircle the shank portion of a conventional barbed-end fishhook and which is capable of functioning as a dough bait retainer or, alternatively, as an artificial lure.

A still further objective of the present invention is to provide a relatively inexpensive yet highly efficient bait securing and retaining means for a conventional fishhook.

Briefly stated, the present invention contemplates the provision of a novel dual purpose device for use in conjunction with a conventional fishhook and is capable of functioning as an artificial bait holder or retainer or, alternatively, as an artificial lure, per se. The dual purpose device is readily attachable and positionable with respect to the elongated shank portion of the fishhook whereby the longitudinal axes of the device and shank portion generally coincide and a helically-extending, continuous wall is provided along substantially the entire length of the fishhook shank portion. The helically-extending wall projects generally radially outwardly from the fishhook shank portion and longitudinally toward one end thereof. Therefore, when used as a dough bait retainer, the helically-extending wall is adapted to embed itself in the bait material, and thus firmly anchor the artificial bait to the fishhook.

As pointed out herebefore, an object of the present invention is the provision of a dual purpose device which is also capable of functioning as an artificial lure, per se. It will be appreciated that by virtue of the spiral wall configuration of the device and its orientation on the fishhook shank portion, when it is pulled through the water the device, fishhook, and any live bait that may be attached thereto move in a fashion not unlike that of a live bait.

The foregoing and other important objects and desirable features inherent in and encompassed by the invention, together with many of the purposes and uses thereof, will become readily apparent from a reading of the ensuing description in conjunction with the annexed drawings, in which:

DESCRIPTION OF THE DRAWINGS

FIG. 1 is a perspective view of a conventional fishhook device embodying the invention; the dual purpose device is shown functioning as an artificial bait holder or retainer;

FIG. 2 is an exploded view showing the dual purpose device detached from the shank portion of the fishhook;

FIG. 3 is a perspective view illustrating the dual purpose device being used as an artificial lure, per se; and FIG. 4 is a vertical sectional view of the dual purpose device taken substantially along line 4—4 of FIG. 1.

DETAILED DESCRIPTION OF THE PREFERRED EMBODIMENT OF THE INVENTION

Referring to the drawings in detail, wherein like reference characters represent like elements throughout the various views, reference character 10 is used to designate a fishhook in its entirety. The fishhook 10 is conventional in every respect and includes a generally elongated shank portion 11 and a curved portion 12 integrally formed and extending from one end of the shank portion 11. The free end 13 of the curved portion 12 is in the form of a sharp barb. The end of the shank portion 11 opposite the curved barbed portion 12 is provided with an eye or ring 14 to facilitate attachment of the fishhook 10 to a suitable line or leader, designated generally by reference character 15.

The dual purpose device embodying the invention is designated generally by reference character 16 and is preferably made of a non-metallic material, such as polypropylene or similar materials having like physical properties. In essence, the device 16 is constructed from a single, elongated ribbon or flat stock of such non-metallic material and is formed so as to generally resemble and possess the resilient characteristics of a helical compression spring.

As clearly illustrated in the drawings, each of the coils 17 of the device 16 resembles a frustum of a cone in side elevation. Since the coils 17 of the device 16 are closely spaced when the device 16 is in its free or uncompressed state, the annular, outwardly facing surface portion 18 of each coil 17 defining the small or lower end thereof, as viewed in FIG. 2 extends or projects longitudinally into the large end 19 of the adjacent coil 17 and, as best illustrated in FIG. 4, is radially spaced from the inwardly facing surface 20 of each adjacent frusto-conically shaped coil 17.

In order to assemble the device 16 on a fishhook 10, the free end 21 of the ribbon partially defining the small end of the lowermost coil 17, as viewed in FIG. 2, is caused to overlap the shank portion 11 of the fishhook 10. Thereafter, by carefully grasping the curved barbed portion 12 of the fishhook 10 with one hand so as to support and prevent the hook from turning, a threading motion is imparted to the device 16 with the other hand. The threading motion is continued until all of the coils 17 of the device 16 completely encircle the shank portion 11 of the fishhook 10, as shown in FIGS. 1 and 3.

As pointed out hereinbefore, an important feature possessed by the dual purpose device 16 of the present invention is its ability to firmly secure itself to the shank portion 11 of a fishhook 10 without the need of employing additional fastening means of any kind. When the device 16 is properly assembled on the fishhook shank portion 11 by following the assembly procedure set forth above and is positioned so as to extend substantially along the entire length of the shank portion 11, as shown in FIG. 1 and 3, the helically extending, innermost edge 23 of the device 16, partially shown in FIG. 4, is tightly pressed into frictional engagement with the fishhook shank portion 11. The helical edge 23, in effect, defines the small or lowermost end of each coil 17, and consequently abuts the shank portion 11 since such shank portion 11 extends through the small or lowermost end of each coil 17, as illustrated in FIG. 4. It will be appreciated, therefore, that the surface of the shank portion 10 frictionally engaged by the innermost edge 23 of the device 16 extends longitudinally along a relatively long, helical path substantially from one end coil 17 of the device 16 to the opposite end coil 17.

The device 16 may be easily detached from the fishhook 10 by simply reversing the procedure outlined above for assembling the device 16 on the fishhook 10. The free end 22 of the device 16 opposite the free end 21 is flexed over and placed in abutting engagement with the fishhook shank portion 11. Thereafter, by simply rotating the device 16 with respect to the fishhook 10 in a counterclockwise direction, as viewed in FIG. 3, the device 16 will detach itself from engagement with the fishhook shank portion 11. It will be appreciated that such assembly and detachment operations or procedures can be accomplished quickly and easily without the need of any tools or the like.

From the foregoing description it is believed the utilization of the dual purpose device 16 as a bait retainer or, alternatively, as an artificial fishing lure, per se, is evident. Assuming that it is desired to use the device 16 as a holder or retainer for a dough or stink dough bait, designated generally by reference character 24 in FIG. 1, a device 16 having an overall length substantially equaling that of the length of the fishhook shank portion 11 of the particular fishhook 10 with which it is going to be used, is initially selected. The device 16 is then assembled on the fishhook 10 following the simple and easy procedure outlined above. A globular mass of dough bait 24 is then packed on and about the fishhook 10 in the customary manner causing the coils 17 of the device 16 to become deeply imbedded in the dough bait material 24. Thus, by virtue of the fact that the entire device 11 is firmly secured to the fishhook 10 and is substantially incapable of moving with respect to the shank portion 11 along the longitudinal axis thereof when installed and because of the frustoconical nature of the coils 17 and the helical configuration thereof, the dough bait 24 will be securely attached to the fishhook 10 and not apt to come off the fishhook 10 prematurely or accidently. It will be appreciated that the device 16 of the present invention provides a simple and efficient means for firmly securing dough bait 24 to a fishhook 10 and, thus, avoiding accidental loss of the bait 24. Consequently, the dough bait 24 will remain useful, or viable for longer periods of time, thereby eliminating the necessity of frequently replacing the dough bait 24. The necessity of frequently replacing the dough bait 24 caused by inadvertant dislodgement thereof from the fishhook 10 rather than be fish 25, per se, is not only frustrating to the fisherman but costly as well.

As pointed out hereinbefore, the dual purpose device 16 of the present invention can also be used in conjunction with a conventional fishhook 10 and when installed therein, is capable of functioning as an artificial lure. FIG. 3 illustrates the use of the device 16 as an artificial lure. While not shown, it is to be understood that the device 16 can also function as supplemental fish lure means to enhance the fish-attracting qualities of a live bait, such as a worm, minnow or other fish food, that may be attached to the barbed-end portion 12 of the fishhook 10 in a conventional manner. Because of the novel configuration of the device 16 and its orientation with respect to the fishhook 10 when pulled through the water the entire assemblage, including any live bait that may be attached to the fishhook 10, is caused to move through the water in a fish-attracting manner.

As is well known, fish are atracted to colors. Moreover, the color or colors fish are most likely to be attracted to in a particular environment is dependent to a great extent upon prevailing weather and light conditions. Therefore, in order to increase the effectiveness of the device 16 when used as an artificial lure, the device 16 is preferably made in a variety of colors, such as yellow, orange, and black. Consequently, the fisherman can select a device 16 having a specific color which he belives will be the most attractive to fish at a particular time and place.

It will be appreciated, however, that since the dual purpose device 16 is completely enveloped and hidden by the dough bait 24 when used, as a bait holder or retainer, its color is immaterial and has no effect on the ability of the device 16 to securely retain the dough bait 24 on the fishhook 10.

The embodiment of the invention chosen for the purposes of description and illustration herein, is that preferred for achieving the objects of the invention and developing the utility thereof in the most desirable manner, due regard being had to existing factors of economy, simplicity of design and construction, manufacturing techniques and the improvements sought to be effected. It will be appreciated, therefore, that the particular structural and functional aspects emphasized herein are not intended to exclude, but rather to suggest, such other adaptations and modifications of the invention, as fall within the spirit and scope of the invention as defined in the appended claims.

What is claimed is:

1. A dual purpose device for use in conjunction with a fishhook having an elongated shank portion and a curved barbed-end portion adjacent thereto, comprising, a plurality of generally flat ribbon of pliable material formed into coils encircling said shank portion, said coils being spaced along the longitudinal axis of said shank portion, each of said coils having its innermost edge frictionally engaging and gripping said shank portion, each of said coils projecting radially outwardly from the longitudinal axis of said shank portion to form an elongated axially spaced helix.

2. A dual purpose device for use in conjunction with a fishhook as set forth in claim 1, wherein each of said coils has a thickness less than its width.

3. A dual purpose device for use in conjunction with a fishhook as set forth in claims 1 or 2, wherein said coils are made of a non-metallic, resilient material.

4. A dual purpose device for use in conjunction with a fishhook as set forth in claims 1 or 2, wherein each coil is integrally interconnected with the coil adjacent thereto.

5. A dual purpose device for use in conjunction with a fishhook as set forth in claim 1, wherein each of said coils also projects longitudinally in one direction from the longitudinal axis of said shank portion.

6. A dual purpose device for use in conjunction with a fishhook as set forth in claim 5, wherein each of said coils has a generally frusto-conical shape in side elevation, and wherein the small end of each coil is disposed within the large end of the adjacent coil.

7. A dual purpose device of use in conjunction with a fishhook as set forth in claim 6, wherein each of said coils has a thickness less than its width and is integrally interconnected with the coil adjacent thereto.

8. A dual purpose device for use in conjunction with a fishhook as set forth in claim 7, wherein said coils are made of a non-metallic, resilient material.

9. A dual purpose device for use in conjunction with a fishhook having an elongated shank portion and a curved barbed-end portion adjacent thereto, comprising, a unitary, elongated, generally flat ribbon of resilient, spring-like, pliable material in the form of an elongated helix to provide a plurality of integrally interconnected coils arranged so as to be axially spaced along the longitudinal axis of the helix, said helix ribbon being detachably mounted on and releasably secured to said shank portion whereby said shank portion extends longitudinally axially through each coil and each coil has an inner, generally circular edge surface frictionally gripping said shank portion, and each of said coils extends radially outwardly from the longitudinal axis of said shank portion.

10. A dual device for use in conjunction with a fishhook as set forth in claim 9, wherein each of said coils also extends longitudinally axially toward one end of said shank portion.

11. A dual purpose device for use in conjunction with a fishhook as set forth in claim 9, wherein said ribbon is made of non-metallic material, and each of said coils has a generally frusto-conical shape in side elevation.

12. A dual purpose device for use in conjunction with a fishhook as set forth in claim 11, wherein the small end of each of said coils is disposed within the large end of the adjacent coil.

13. A bait holder or retainer device for use in conjunction with a fishhook having an elongated shank portion and a curved barbed-end portion adjacent thereto for holding or retaining a globular mass of semi-plastic bait material substantially enveloping the fishhook, comprising, a plurality of wall means detachably secured to and axially spaced along the longitudinal axis of said shank portion, being generally flat ribbon of pliable material to form an elongated axially spaced helix, each of said wall means projecting radially outwardly from the longitudinal axis of said shank portion and being capable of embedding itself in said bait material to anchor the same to said fishhook.

14. A bait holder or retainer device as set forth in claim 13, wherein each of said wall means is in the form of a coil which encircles said shank portion, each of said coils having a thickness less than its width and being integrally interconnected to the coil adjacent thereto.

15. A bait holder or retainer device as set forth in claim 14, wherein said coils are made of a resilient, pliable, non-metallic material and has a generally frusto-conical shape in said elevation, and wherein the small end of each coil extends axially into the large end of the adjacent coil.

* * * * *